Jan. 10, 1933.      L. J. BLACK      1,893,486
SHOCK ABSORBER FOR ROTATABLE ELEMENTS
Filed July 8, 1930      3 Sheets-Sheet 1

Inventor
Lee J. Black
By 
Attorney

Jan. 10, 1933.  L. J. BLACK  1,893,486
SHOCK ABSORBER FOR ROTATABLE ELEMENTS
Filed July 8, 1930   3 Sheets-Sheet 2
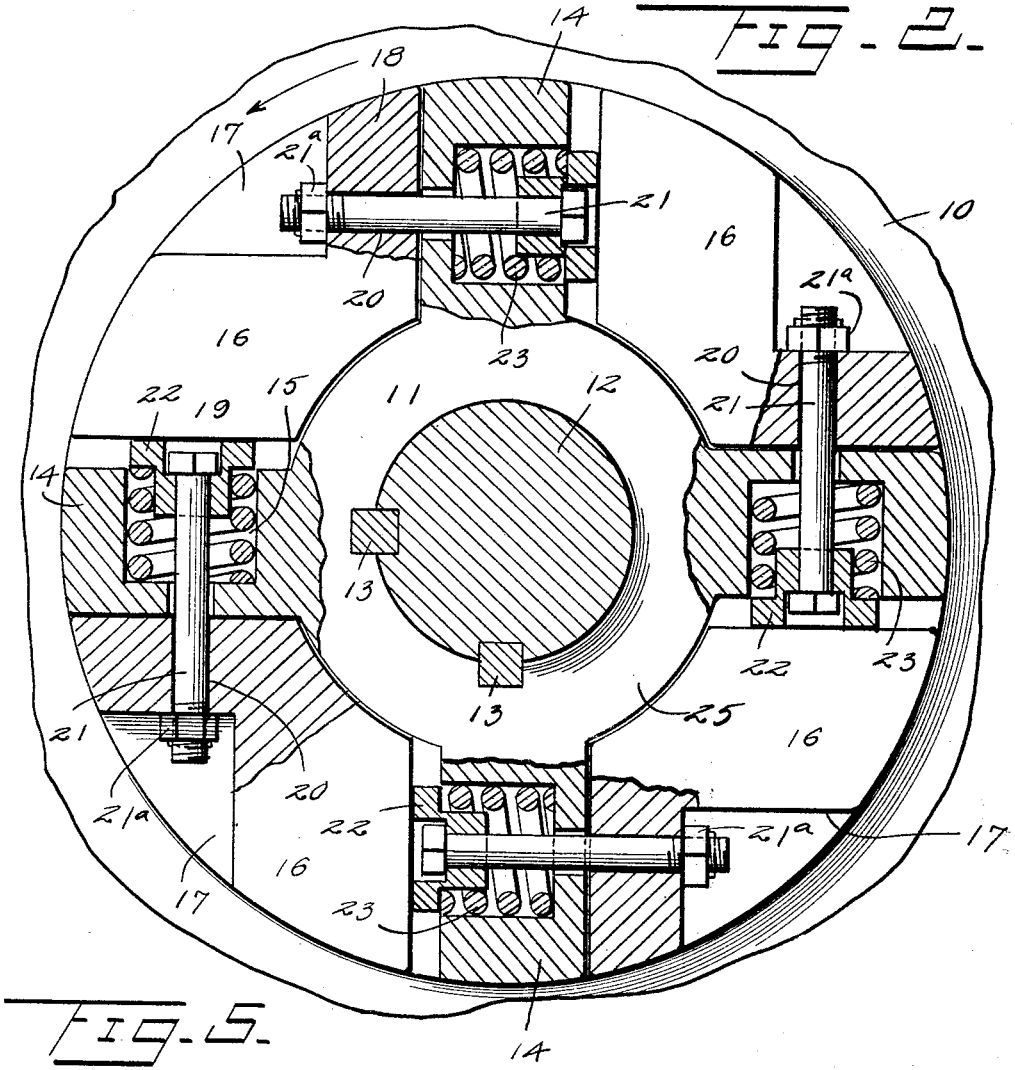
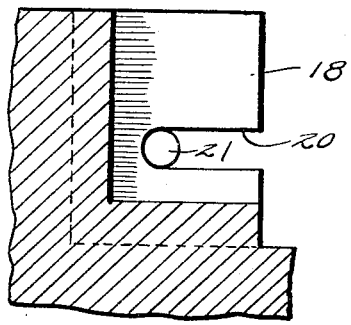
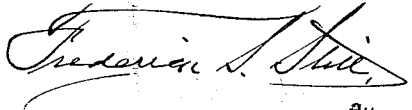
Inventor
Lee J. Black Jan. 10, 1933.  L. J. BLACK  1,893,486
SHOCK ABSORBER FOR ROTATABLE ELEMENTS
Filed July 8, 1930  3 Sheets-Sheet 3
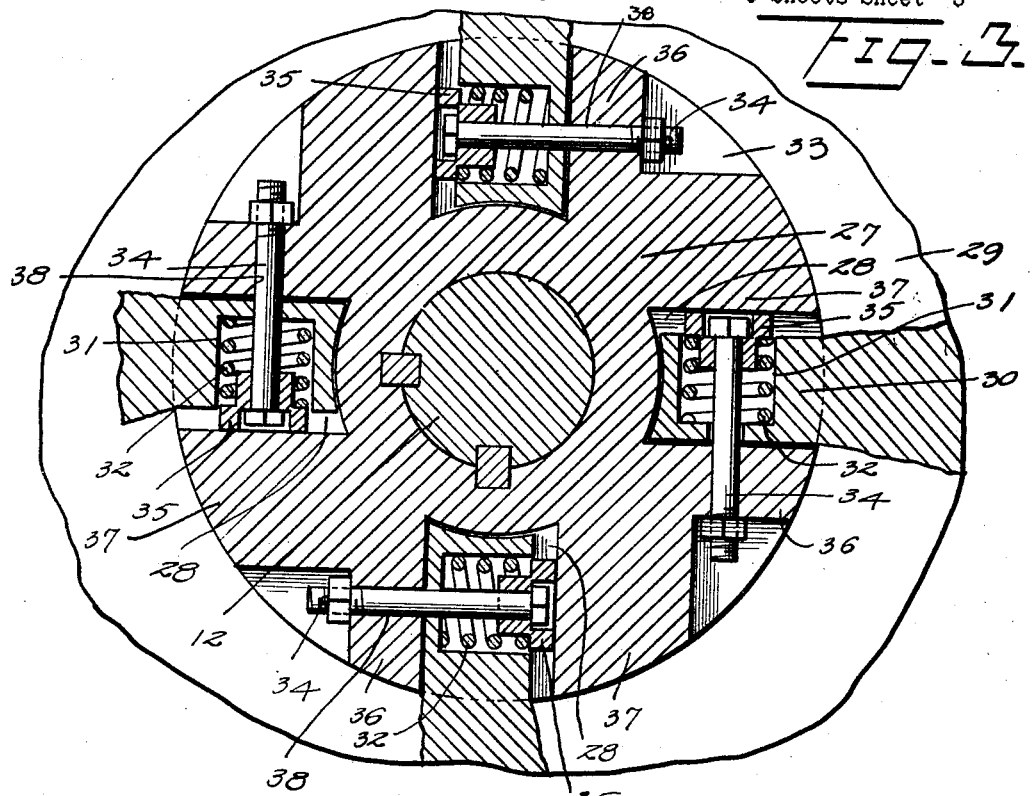
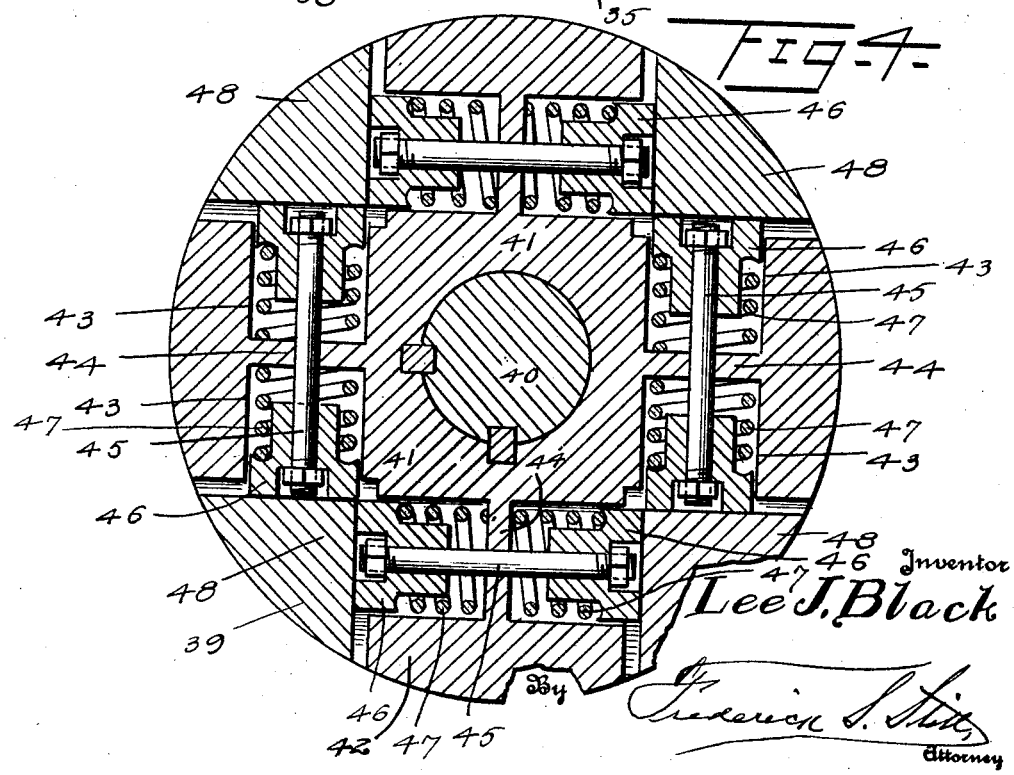
Inventor
Lee J. Black
By
Frederick S. Hitz
Attorney Patented Jan. 10, 1933

1,893,486

UNITED STATES PATENT OFFICE

LEE J. BLACK, OF BEAUMONT, TEXAS

SHOCK ABSORBER FOR ROTATABLE ELEMENTS

Application filed July 8, 1930. Serial No. 466,528.

This invention relates to shock absorbing devices and particularly to a shock absorber disposed in connection with coacting driving and driven elements mounted on a common shaft or concentric therewith, one of the elements being loose on the shaft and the other fast thereon.

One of the objects of the present invention is to provide a shock absorber assembly of this character in which the shock is absorbed by coiled compression springs disposed between overlapping members on the driving and driven elements, and a further object is to provide pockets in one of said elements for the springs and bolts holding the springs in place, the construction being such that no strain comes upon the bolts other than that necessary to partially tension the springs.

Another object is to provide a construction of this character which will act to cushion and absorb shock upon a movement of the driving element in either direction, thus making the shock absorber applicable to devices having sudden reversals.

Other objects will appear in the course of the following description.

My invention is illustrated in the accompanying drawings, wherein:—

Figure 2 is a section on the line 2—2 of Figure 1 the parts being shown in elevation;

Figure 3 is a side elevation of a modified form of shock absorbing driving structure, with one of the elements in section;

Figure 4 is a sectional view through another modified form of shock absorbing driving structure;

Figure 5 is a fragmentary section on the line 5—5 of Figure 1.

Figure 1:
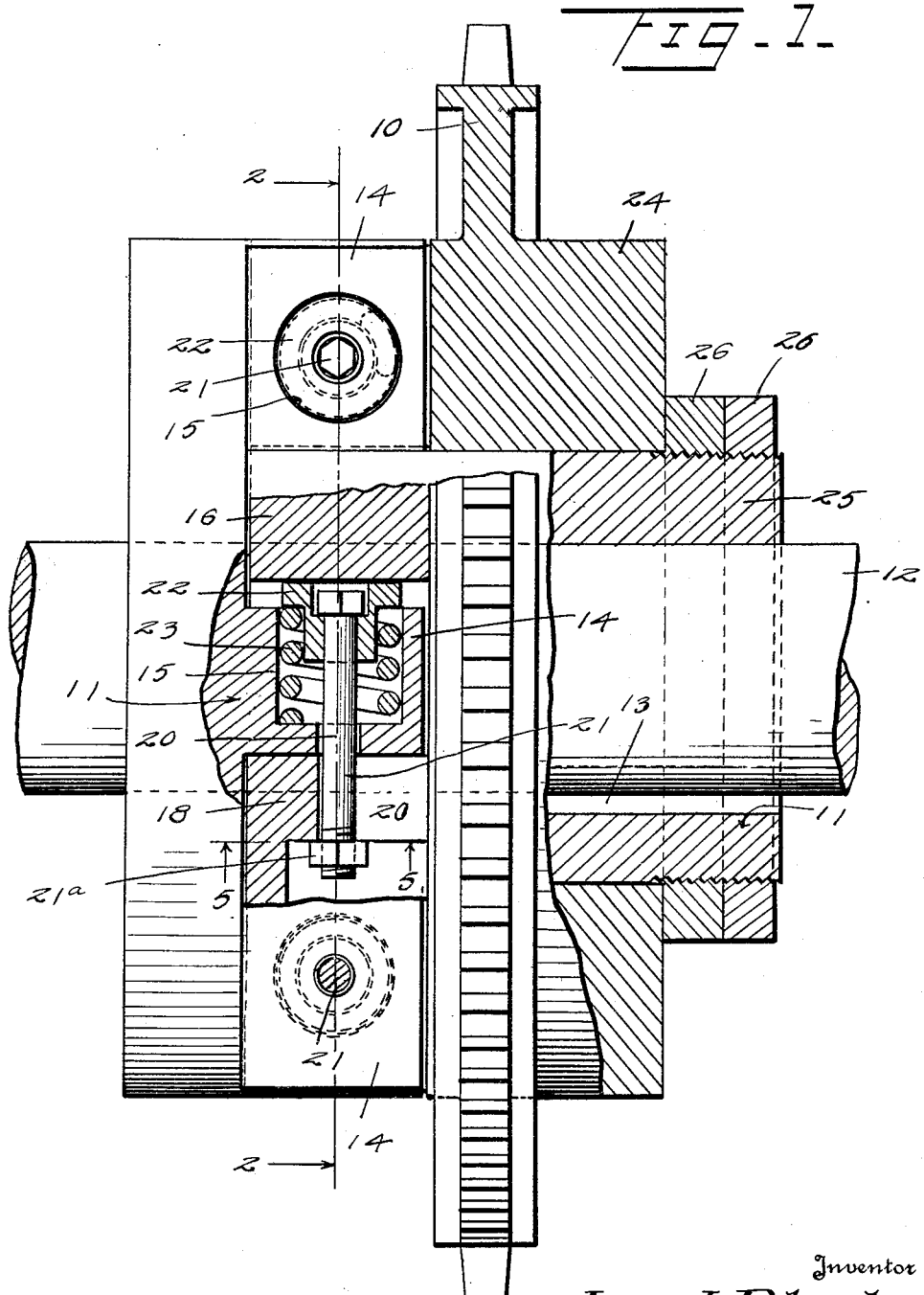
Figure 1 is an elevation partly in section of a shock absorbing driving structure constructed in accordance with my invention.
Figure 1:
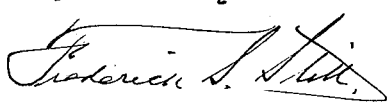

Referring particularly to Figures 1 and 2, 10 designates a driving element which in this case is shown as a sprocket wheel rotating in the direction of the arrow and 11 designates the driven element which is mounted upon a shaft 12 by means of the keys 13. The driving element is loosely mounted upon the shaft 12. The driven element 11 is formed at intervals with laterally projecting lugs 14, each of these lugs being formed in the lateral face with a pocket 15.

The driving element 10 is also formed with laterally projecting lugs 16 which are disposed between the lugs 14 so that the lugs 14 and 16 overlap. These lugs 16 are angular in elevation as shown most clearly in Figure 2 or in other words are cut out at 17. Each of these lugs 16, therefore, has two right angularly related portions 18 and 19, each portion 18 being formed with a laterally extending slot 20 for the reception of a bolt 21. This bolt passes through the slot 20 and the head of the bolt is disposed within the corresponding pocket 15. The nut 21$^a$ of each bolt is disposed within the recess 17. The head of the bolt carries upon it a cap 22 recessed upon its face to receive the head of the bolt, this cap 22 having a body portion fitting within a coiled compression spring 23 and laterally projecting flanges extending over and fitting against the end of the spring 23 and approximately fitting the pocket 15. The space between the opposed faces of the lugs 16 is greater circumferentially than the thickness of the lugs 14 so that the lugs 14 would have a certain freedom of movement in the spaces between the lugs 16 were it not for the spring 23 which urges the corresponding cap 22 against the face of the portion 19 of the lug 16. As illustrated, the member 11, as before remarked, is keyed upon the shaft and one side of the member 10 has a diameter equal to the diameter of the hub 24 of this element. The driving element 10 is rotatably mounted upon the hub 25 of the driven member 11 and is held in place thereon by the nuts 26.

It will be seen now when the driving member 10 rotates in the direction of the arrow in Figure 2, that its action will be to compress the springs 23 before transmitting power to the driven member.

Thus as the driving member rotates in the direction of the arrow, the portion 19 of each of the lugs 16 will bear against the corresponding cap 22, forcing this cap inward and compressing the corresponding spring 23 until gradually the power will be transmitted to the driven member. The degree of compression of the springs before the faces of the portions 19 engage against the opposed faces of the lugs 14, will depend upon the difference in width between the lugs 14 and the spaces in the driving element which the lugs occupy.

In Figure 2, I have illustrated a driven element 11 having four lugs and a driving element having eight lugs, that is, having angular lugs 16 with two angularly disposed portions 18 and 19 confronting the lugs 14 and thus is the equivalent of eight lugs on the driving member operating in conjunction with four lugs on the driven member.

While I have heretofore described the loose element 10 as being the driving member and the member 11 as being a driven member, it will be understood that the member 11 might be the driving member and the member 10 the driven member. In either case, shock would be absorbed between the driving and driven members by the springs 23.

In Figure 3, I show a slightly different arrangement operating on exactly the same principle, however, in which there is mounted upon the shaft 12 a driving member 27, this member being keyed upon the shaft and having formed therein the four radial recesses 28. The driven element 29 is formed with laterally projecting lugs 30 which extend into these radial recesses 28, these lugs 30 being formed with circumferentially extending pockets 31 wherein are disposed coiled springs 32.

It will be seen that the driving member 27 is recessed or cut away at 33 between the recesses 28 to receive the nut end of the bolt 34, there being a bolt for each pocket, the head of the bolt bearing against a cap 35 formed in turn to fit the pocket and bear against the extremity of the corresponding spring 32. Between each recess, therefore, there are provided two lugs on the driving member designated 36 and 37, the bolts 34 passing through the lugs 36 and the caps 35 abutting against the lugs 37. I have thus illustrated in Figure 3 a driving member 27 having eight lugs meshing into a driven member having four lugs. In this case, power will be applied to the shaft and the power take-off would be from the driven member 29. When power is applied to the driving member 27, this acts to compress the springs and relieve any shock which might be between the power take-off and the shaft. The only difference between the construction shown in Figure 2 and that shown in Figure 3 is the difference in the style of the driving member 27.

It will be understood, of course, that in this case also the lugs 36 are slotted laterally for the reception of the spring bolt 34, the slot being designated 38. It is necessary that these members 36 be slotted as at 38 in order that the parts may be assembled. In order to make the assembly, it is necessary to compress the spring until it will enter into the space provided by the different widths of lugs and in order to get the full benefit of the tension of the spring, the spring bolt for each pocket should have its cap 35 in Figure 3 and 22 in Figure 2 tightened up until about one-half of the tension of the spring is taken up.

The other half of the pressure of the spring permits further operation to take care of the shock.

In Figure 4, I have illustrated another application of my invention designed to be used as a double reversible shock absorber. In this case, the power take-off is from the shaft and the application of the power is to the driving member 39. The element 39 is loose on shaft 40 and the driven element 41 is keyed to the shaft 40. As illustrated, the driven element 41 is formed with four radially extending lugs 42, each lug being formed with pockets 43 extending inward from opposite faces of the lug. Extending through the wall 44 between these pockets is the bolt 45. Each bolt carries upon its opposite ends the caps 46, each cap bearing against a coiled compression spring 47. The driving element 39 has laterally projecting lugs 48 which project into the spaces between the lugs 42 and each lug 48 has two faces at right angles to each other, each of these faces bearing against the cap 46. The distance between the face of one lug 48 and the opposed face of the adjacent lug 48 is greater than the width of the lugs 42 and the springs 47 urge the caps 46 outward against these opposed faces of the lugs 48. Therefore, it will be obvious that power applied to the driving element in either direction will be cushioned so that the driving element may be suddenly reversed and yet a proper cushioning effect or shock absorbing effect will be secured. With this assembly, power may be either applied to the member 40 and to the element 39 or applied to the element 39 and transmitted to the shaft 40 and in both cases a double acting cushioning mechanism is secured which will absorb the shock in either direction of rotation.

This shock absorbing mechanism has been particularly designed for use under circumstances where the engine is thrown into reverse from 250 R. P. M. forward and under steam pressure. These shock absorbing devices are particularly designed for use with oil well drilling mechanism, but are obviously not limited to this use.

I claim:—

1. Rotatable driving and driven elements and a shaft upon which one of the said elements is fixedly mounted and the other of said elements loosely mounted, one of said elements having pairs of spaced apart lugs, the other element having lugs extending into the spaces between said pairs of lugs, but less in width than said spaces, and having pockets confronting one lug of each corresponding pair of lugs, compression springs disposed in said pockets, a cap engaging over the outer end of each compression spring and urged against the confronting face of the corresponding lug of the other element, and a bolt extending loosely through each cap and spring and through the rear wall of the pocket and through the adjacent lug of the other element, the bolt acting to limit the outward movement of the cap under the action of the spring, said spring yieldingly resisting movement of the lugs of the two elements toward each other in one direction and into contact.

2. A shaft, a rotatable driving element and a rotatable driven element mounted on said shaft, one of said elements being fast thereto and the other being loose thereon, the elements being disposed side by side, laterally projecting pairs of spaced apart lugs on one of said elements, laterally projecting lugs on the other element interdigitating with the pairs of lugs, but being less in width than the spaces between said pairs of lugs, spring pockets formed in the interdigitating lugs and confronting one lug of each pair of lugs, compression springs disposed in said pockets, caps engaged over the compression springs and yieldably urged outward from the pocket and into engagement with the confronting lug of a pair, each cap having a recess in the center, a bolt passing loosely through the cap and having a head disposed in said recess, the bolt passing through the compression spring and through the rear wall of the pocket, and through the adjacent lug of the corresponding pair of lugs and having a nut, the bolt limiting the outward movement of the cap under the action of said spring but permitting the cap to move inward toward the rear of the corresponding pocket when rotative force is applied to the driving element.

3. A shaft, a rotatable driving element and a rotatable driven element mounted on said shaft, one of said elements being fast thereto and the other being loose thereon, the elements being disposed side by side, laterally projecting pairs of spaced apart lugs on one of said elements, laterally projecting lugs on the other element interdigitating with the pairs of lugs but being less in width than the spaces betweeen said pairs of lugs, spring pockets formed in the interdigitating lugs and confronting one lug of each pair of lugs, compression springs disposed in said pockets, caps engaged over the compression springs and yieldably urged outward from the pocket and into engagement with the confronting lug of a pair, each cap having a recess in the center, a bolt passing loosely through the cap and having a head disposed in said recess, the bolt passing through the compression spring and through the rear wall of the pocket, the adjacent lug of the corresponding pair of lugs being formed with a slot in which the shank of the bolt is disposed, the bolt having a nut bearing against the outer face of the lug.

4. A rotatable driving element and driven element, a shaft upon which one of said elements is mounted for rotation therewith, the other element being loose upon the shaft, one of said elements having laterally projecting pairs of lugs, the other of said elements having laterally projecting lugs interdigitating with the lugs of the first named element, the lugs of the first named element being spaced apart a distance greater than the lugs of the second named element, the lugs of the second named element each having two opposed pockets opening upon opposite faces of the lugs, coiled compression springs disposed in each pocket, caps disposed in each pocket and urged outward against the face of the confronting lug of the first named element by said springs, and a bolt for each pair of pockets passing through the dividing wall between the pockets and through the caps, the caps each being recessed at the center and the bolt having a head and nut disposed in said recess in the opposite caps, springs urging the cap outward against the confronting lugs of the first named element, and yieldingly resisting movement of the confronting portions of the two sets of lugs toward each other and into contact.

In testimony whereof I affix my signature.

LEE J. BLACK.